United States Patent [19]

Howarth

[11] Patent Number: 5,276,871
[45] Date of Patent: Jan. 4, 1994

[54] METHOD OF FILE SHADOWING AMONG PEER SYSTEMS

[75] Inventor: David I. Howarth, Westford, Mass.

[73] Assignee: Bull HN Information Systems Inc., Billerica, Mass.

[21] Appl. No.: 671,032

[22] Filed: Mar. 18, 1991

[51] Int. Cl.⁵ .............................. G06F 15/16
[52] U.S. Cl. ........................ 395/600; 395/425; 364/245.5; 364/246; 364/DIG. 1
[58] Field of Search ............... 395/425, 600; 364/200

[56] References Cited

U.S. PATENT DOCUMENTS

| | | | |
|---|---|---|---|
| 4,897,781 | 1/1990 | Chang et al. | 364/200 |
| 4,928,224 | 5/1990 | Zulian | 364/200 |
| 5,043,876 | 8/1991 | Terry | 364/200 |
| 5,113,514 | 5/1992 | Albonesi et al. | 395/425 |

Primary Examiner—Thomas C. Lee
Assistant Examiner—Michael A. Oblon
Attorney, Agent, or Firm—Gerald J. Cechony; Gary D. Clapp; John S. Solakian

[57] ABSTRACT

In a distributed network comprising a plurality of peer (as opposed to master-slave) computers, a method of file shadowing allows each peer computer to maintain copies of data entries originated by the other peer computers in near-real time. Each computer assigns a unique serial number to each entry, and forwards each entry with the serial number and an identification of itself to all the other computers. Each computer informs each other computer of the highest sequential serial number received from it, and each computer resends to each other computer all entries having serial numbers higher than that acknowledged by each other computer.

6 Claims, 2 Drawing Sheets

EFTPOS 1

METHOD OF FILE SHADOWING AMONG PEER SYSTEMS

CROSS REFERENCES TO RELATED APPLICATIONS

The present patent application is related to: U.S. patent application Ser. No. 07/662,875, pending for A CASCADED SOFTWARE DISTRIBUTION METHOD by Anthony J. Booth et al., filed Mar. 3, 1991 and assigned to the assignee of the present patent application;

U.S. patent application Ser. No. 07/662,856, pending for A METHOD FOR SECURING AN UNATTENDED WORKSTATION by David I. Howarth, filed Mar. 1, 1991 and assigned to the assignee of the present patent application;

U.S. patent application Ser. No. 07/671,063 pending for A METHOD FOR GUARANTEEING DELIVERY OF MESSAGES IN A DISTRIBUTED COMPUTER NETWORK by David I. Howarth, filed Mar. 18, 1991 and assigned to the assignee of the present patent application;

U.S. patent application Ser. No. 07/671,323 pending for INTELLIGENT NODE-RESIDENT FAILURE TEST AND RESPONSE IN A MULTI-NODE SYSTEM by Joel R. Spencer et al., filed Mar. 19, 1991 and assigned to the assigned of the present patent application;

BACKGROUND OF THE INVENTION

1. Field of the Invention

The invention pertains to distributed computer networks, particularly to enhancing the shadowing of files among peer control computers within such networks.

2. Description of the Prior Art

The invention is embodied in an EFTPOS (Electronic Funds Transfer/Point of Sale) system such as the one described in U.S. Pat. No. 4,879,716, "Resilient Data Communications System", issued Nov. 7, 1989 to McNally et al (hereinafter, "the McNally patent").

A large number of point-of-sale (POS) terminals are distributed over a very large geographical area, perhaps on the order of an entire continent. A communications network is provided which transports data over the entire geographical area, and all the POS terminals are connected to it, through telephone lines and intelligent line concentrators (called network access controllers, or "NACs"). Also connected to the communications network are computers operated by financial institutions.

The POS terminals are typically placed into service by merchants, who then accept transactions from consumers who carry plastic credit cards or debit cards which bear in machine-readable form an identification of a financial institution which maintains an account for the consumer, and an identification of that account. The primary function of the system is to forward from the POS terminals to the financial institution computers information identifying a consumer's account and a transaction the consumer wishes to make in that account, and to return from the financial institution to the POS terminal either an acceptance or rejection of that transaction.

A merchant wishing to place a POS terminal into service typically obtains the necessary equipment (the terminals and associated modems, etc.) from a "service provider" organization. Such an organization might have no role in the EFTPOS system beyond that of providing equipment, or larger merchants and financial institutions might function as service providers; in that case the latter role is kept separated from the former.

In addition to line concentrators for POS terminals and computers of financial institutions being connected to the communications network as described above, two other classes of equipment are connected to it which exist ancillarily to the system's aforementioned primary function: network management systems (NMSs), and management workstations (WSs). (WSs are not specifically discussed in the McNally patent, but are at the heart of SAFs 12 and are attached to NMSs 14 to provide an interface between operators and NMSs.)

NMSs are responsible for overall control and monitoring of the EFTPOS system; WSs are used by the network provider organization and service provider organizations to control and monitor particular equipment and communication paths for which they are responsible. As described in the McNally patent, the NACs can be dynamically reconfigured and can report their present status; operators and administrators at the WSs may enter commands to reconfigure the systems or commands requesting information on the current status of the systems. Commands originating at a WS are passed to an NMS for verification that the action or information requested is within the purview of the requesting organization, and are acted upon by the NMS following that verification.

The WSs and NMSs have software running in them to effect the entry of such commands and the responses to them. Each particular type of command typically invokes a particular path through the software, causing the execution of executable paths that are provided to perform particular functions required for a particular command. A software entity dedicated to a discrete function is known in the software arts as a "process".

WSs and NMSs are distributed throughout the geographical area served by the system. The NMS in a particular region of the geographical area generally exercises direct control and monitoring of the POS terminals and NACs in that particular region. A request pertaining to such a terminal or NAC and originating from a process in a WS or NMS in a different region must be forwarded over the communications network to a process in the NMS having cognizance of the target NAC, and a response must be forwarded back to the requesting process.

Should an NMS become unavailable other NMSs will be directed by operational personnel to assume its functions. In order to be prepared for such eventualities, critical information that may originate at any NMS at any time regarding the status of the network and its users must be disseminated to all NMSs as soon as possible.

The term 'shadowing' is used to describe a process which seeks to maintain a second copy of a file identical to some declared subset of a first file. The second copy of the file normally exists in a different computer system from the first copy. It is accepted that, at any instant, the second copy may not be identical to the first due to delays introduced by the copying and transmission methods. The second copy has two important characteristics: It is usable even if it is not identical to the first copy; the shadowing process ensures that the second copy will eventually become identical to the first copy.

Prior-art methods of file shadowing are generally "master-slave" arrangements wherein an entity maintaining a master file periodically sends updates to one or more slave entities in order for them to update their files; in the event that the master fails, one of the slaves takes over as the new master. The updates being periodic, it must do so without benefit of new information since the last periodic update. The prior-art methods may become unworkable if the computers are to be regarded as peers, rather than a master and a slave or slaves.

SUMMARY OF THE INVENTION

The present invention enables file shadowing among peer computers and enables updates to copies of the same file to occur simultaneously at different computers and the file updates to be shadowed to the peer copies of the file. The peer computers are interconnected by communication links. Each peer maintains an accurate internal clock, all using the same basis, such as universal time. Each peer stamps each record it originates in its files with an ascending serial number and with the date and time. Each peer repetitively sends to all other peers acknowledgements of the most recent serial numbers it has received from them. In response to receiving such messages, each peer sends to the other peers copies of the entries it has originated in its files after the received serial number. The date/time stamps on the records are used to resolve any conflicts that arise due to updates arriving from multiple NMSs out of time sequence; the record bearing the later stamp prevails.

The method is most readily applied to files containing freestanding records. More complex file structures generally require that the using programs include exception logic to handle any inconsistencies between related records.

OBJECTS OF THE INVENTION

It is thus a general object of the invention to improve reliability and configurability of distributed data systems.

It is a particular object of the present invention to provide distributed data systems having multiple control nodes with improved methods of redistributing the functions of a failed control node.

It is a more particular object of the present invention to provide improved methods of file shadowing among multiple control nodes of a distributed data system.

This and other objects of the invention will be apparent to those skilled in the art after reviewing the following description of the preferred embodiment and the appended drawings, wherein:

DESCRIPTION OF THE PREFERRED EMBODIMENT

Figure 1:
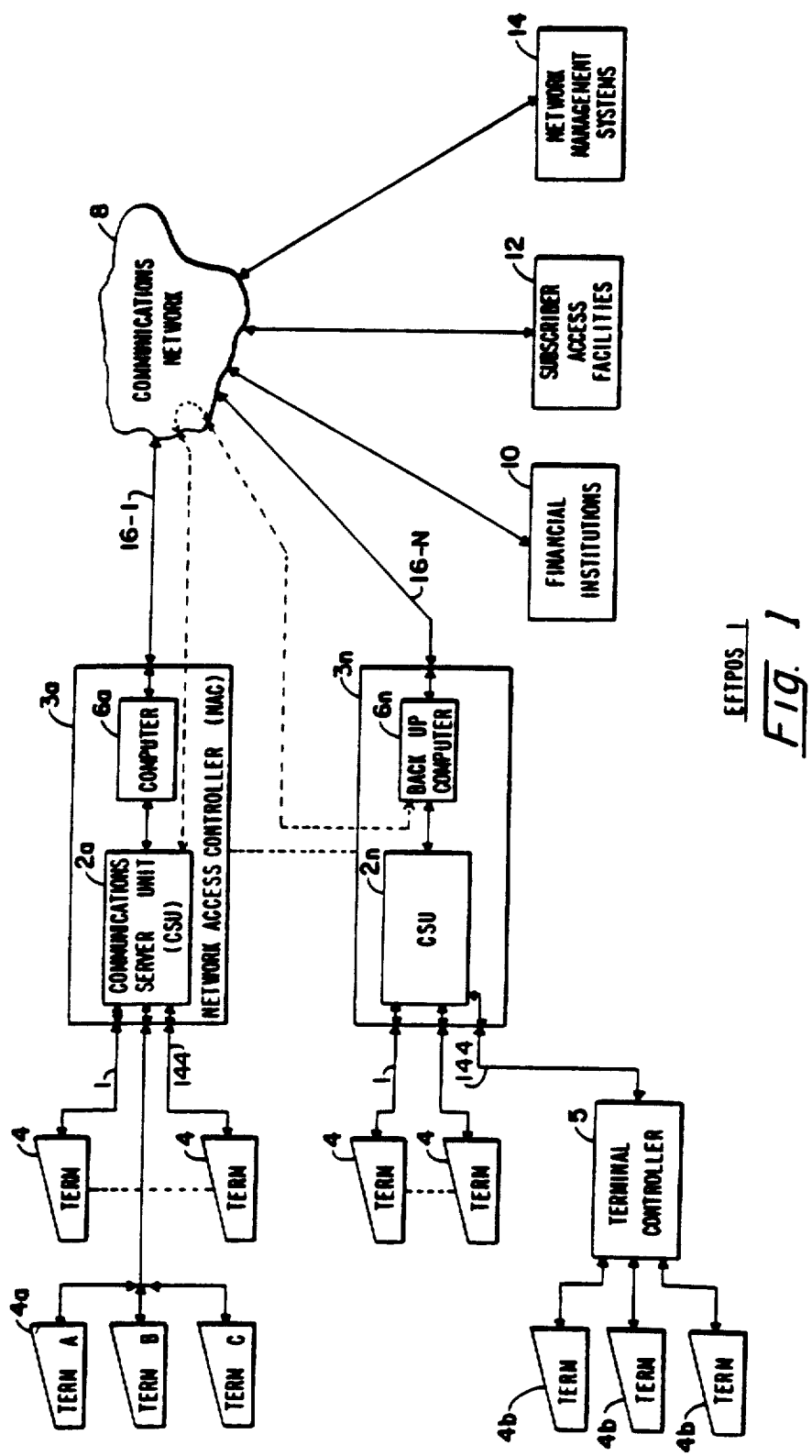
FIG. 1 provides an overview of the distributed data system in which the present invention is embodied.

FIG. 1, reproduced here from the McNally patent, provides an overview of the system in which the present invention is embodied, showing NACs 3, terminals 4, communications network 8, financial institutions 10, SAFs 12, NMSs 14, and communication lines 16.

Figure 2:
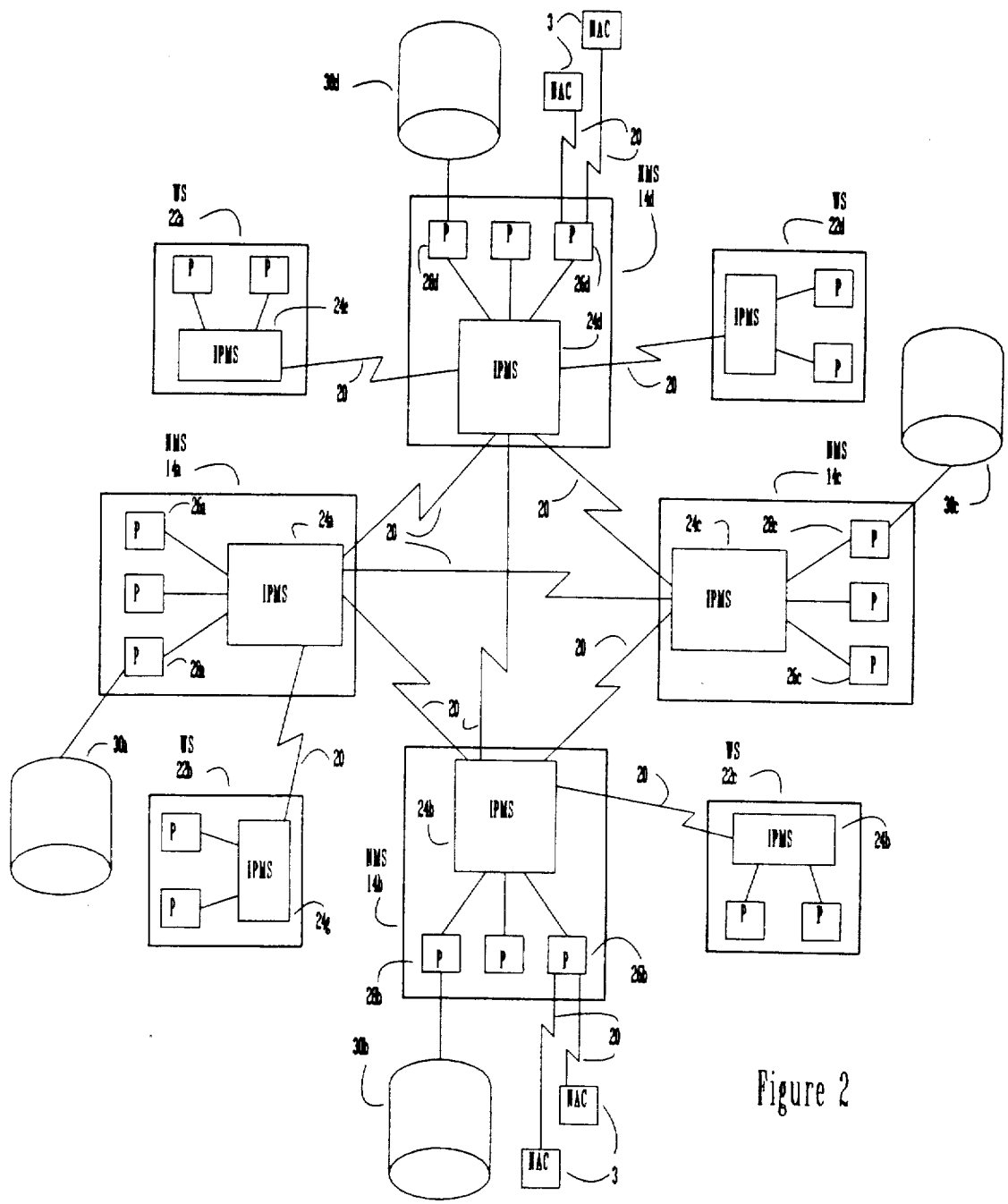
FIG. 2 provides further detail of that portion of the distributed data system embodying the present invention.

FIG. 2 provides greater detail in those portions of the system directly involved with the present invention. Four NMSs 14 are shown (the number four being chosen arbitrarily), denoted 14a through 14d. Four workstations (WSs) 22 (denoted 22a through 22d) are shown. WSs are the main component of SAFs 10 and may be considered equivalent to SAFs 10. WSs may exist on the system for use by organizations other than service provider organizations, such as the common carrier which provides communication network 8.

Each NMS and WS is depicted as hosting a number of processes denoted "P". These are software processes; i.e., as discussed above, software entities dedicated to particular functional tasks.

The units depicted in FIG. 2 are shown as being interconnected by communication links 20. These links are conceptual, and might be implemented through communications network 8, or they might be LANs, WANs, or telephone lines. (In the present embodiment, inter-IPMS links and IPMS-NAC links are in all probability implemented through communications network 8.) Regardless of the nature of the link between a WS and an NMS, a WS is normally linked to only one NMS; should the WS originate a command that must ultimately be resolved by a different NMS, said different NMS will be accessed as a result of NMS-to-NMS communication, and not by virtue of establishing a link between the WS and said different NMS.

A number of NACs 3 are shown in FIG. 2. As has been discussed, the primary purpose of the system is to carry data pertaining to financial transactions bidirectionally from terminals 4 (not shown in FIG. 2) through NACs 3 to financial institutions 10 (also not shown in FIG. 2). FIG. 2 does not depict this role of the NACs 3, but rather depicts the paths by means of which NACs 3 are controlled and interrogated. Of the plurality of processes shown in NMSs 14, processes 26 (26a through 26d) are instances of a process called the Administrative Traffic Switch (ATS) process, the function of which is pass control messages to NACs and to receive status and alarm information from NACs.

Working closely with ATS processes 26 are Network Status Monitor (NSM) processes 28, having an instance in each NMS. NSM 28 maintains XLOG files 30, having an instance at each NMS. XLOG 30 is used by NSM 28 to maintain a running record of the status of all the NACs (and all the data paths to terminals 4 effectuated by those NACs) within the administrative purview of a particular NMS.

Other processes anywhere in the system may wish to interrogate an instance of NSM 28 to determine the status of a system component or path, or to have an instance of ATS 26 forward a configuration command to a NAC. As FIG. 2 shows, every WS and NMS has resident an instance of the Inter-Process Message Service (IPMS) 24. Processes, regardless of whether resident in the same WS or NMS or in different entities, do not communicate with each other directly, but through the IPMS. It is a system rule that processes in different workstations may not communicate with each other. It is also a system rule that any interprocess communication, only one NMS-to-NMS transmission is permitted. (In order to facilitate this, each NMS has a link 20 to every other NMS.)

Each NMS is assigned a unique name. By way of example, if the geographical area to be covered were the continental U.S., the NMSs 14 might be located and named thusly:

One in the northwest, which might be named "NW-NMS";

One in the southwest, which might be named "SW-NMS";

One in the northeast, which might be named "NE-NMS"; and

One in the southeast, which might be named "SE-NMS".

Each NMS would typically manage NAC's in its geographical region, and respond to workstations in its geographical region. But, by configuring the communication links 20 appropriately, an NMS could, if need be, manage any NACs and respond to any workstations regardless of location. Each WS is likewise assigned a unique name.

Operators at WSs are engaged in configuring NACs, POS terminals, and telephone lines connecting POS terminals to NACs. In support of these activities, processes in an NMS to which a WS is connected make entries in files denoting the current configuration. For example, an NMS process called Directory Services (process name "DSV") maintains information describing, for example, the characteristics or attributes of network users. It is desirable to transmit such information to the directory files of the other NMSs as soon as possible, for use by operators at WSs connected to those other NMSs, and in anticipation of the eventuality that a particular NMS may fail and that other NMSs will have to take over the functions it was performing. While directory information is not the only class of information that is shadowed in the present embodiment, it will be used as exemplary for expostulating the invention.

As is well known to those in the computer arts, different "views" of a file may be maintained. That is, the same file may be viewed as being sorted on different keys by maintaining separate "view files" or "index files" for each desired view. By way of hypothetical example, a file containing a list of people's names and birthdates might contain those entries in any order, but there could be a view file indicating the order in which records should be accessed so that the names are retrieved in alphabetical order, and there could be another view file indicating the order in which records should be accessed so that the birthdates are retrieved in chronological order. In the present embodiment, each entry made by the DSV process contains the identity of the NMS originating or changing the entry and an ascending serial number. A view file is maintained for viewing the records in chronological order by originating NMS.

As has been discussed, a number of NMSs are employed to manage the system. If any one of them fails, others are reconfigured to take over its functions. This mandates that each NMS be provided with copies of the entries each NMS makes in its files (such as the directory services file) as soon as possible, so that as little functionality as possible is lost when an NMS fills in for another NMS. Another reason why it is desirable to do this as soon as possible is that commands pertaining to a managed entity managed by a particular NMS might need to be entered at any of the NMSs. Commands are always routed to the NMS managing the target object and function for security verification before being acted upon; it is the responsibility of IPMS to ensure that messages are routed to the correct NMS.

In order to facilitate this file shadowing among peer NMSs, each NMS is informed what other NMSs exist. It sends to each of the other NMSs a message indicating the serial number of the last update message it received from that NMS. Each time an NMS processes a command that results in it's making an entry in one of the files that is to be shadowed, it stamps that record with its (NMS') identity, date/time, and serial number. It also maintains a view or index of that file sorted on the serial number within NMS.

Repetitively the instance of DSV in each NMS sends to the instances of DSV in all the other NMSs messages stating the serial number of the most recent message received from those instances (or a serial number of zero if no messages have been received from that NMS). Responsive to receiving those messages, the instance of DSV in each NMS endeavors to send to each other NMS copies of any entries it has made in its files which have higher serial numbers than the ones received in those messages. This results in each NMS's shadowing the files of its peers in "near real time", that is, with only as much delay as necessitated by the exigencies of real-time scheduling and such delays as may inhere in communications links 20. In the event that a gap exists in the serial numbers in the sending NMS a message is sent to account for the missing serial numbers. This method also ensures that messages lost in transmission will be resent until correctly received.

Since each NMS is operating asynchronously relative to the others, and since some may at a particular time be handling a heavier load than the others, and owing to differing transmission times among the different ones of communication links 20, there is no assurance that copies of entries arrive at a destination NMS in the same order in which they have been entered at various originating NMSs. In these cases the version of the record with the latest date/time stamp prevails.

Those skilled in the art will perceive applications of the invention in embodiments other than the one described here. The invention is intended to be embraced by the appended claims and not limited by the foregoing embodiment.

I claim:

1. In a distributed computer network having a plurality of control computers interconnected by switched communications links, each control computer maintaining files comprising entries containing information used in controlling operations of the control computer, a method of file shadowing to be practiced in each control computer, comprising, in each control computer, the steps of:

assigning a unique serial number to each of said entries made in said files by the control computer;

receiving and storing in said files copies of entries received from the files of each other control computer, each of said copies of an entry received from an other control computer including the unique serial number assigned to the entry by the other control computer;

sending to each other control computer an acknowledgement message containing the highest serial number assigned to an entry in a copy of an entry received from said each other control computer; and, in response to each acknowledgment message received from an other control computer, sending to the other control computer copies of said entries having serial numbers higher than that received in the acknowledgment message received from the other control computer;

assigning a date/time stamp to each of said entries made in said files; and if a control computer receives duplicate serial numbers from another control computer, the entry bearing the latest date/time stamp prevails.

2. The method recited in claim 1, wherein further:
a new control computer, upon being initiated:
  is informed of the identities of each other control computer; and
  sends to each other control computer an acknowledgement message containing zero as the highest sequential serial number received from each other control computer.

3. The method recited in claim 2, wherein further:
each control computer, in response to said acknowledgement messages from said each other control computer, resends all serial numbers higher than that received in said acknowledgement message,
  each serial number being accompanied by its corresponding entry if extant, or by a predetermined code if a corresponding entry is no longer extant, whereby a control computer can have certainty of receiving all extant entries from each other control computer.

4. In a distributed computer network having a plurality of control computers and a plurality of managed entities, the control computers being interconnected by switched communications links,
  each control computer controlling a portion of the plurality of managed entities and maintaining files comprising entries recording information indicative of the status of said portion of the plurality of managed entities,
  a method to be practiced in each control computer of promulgating said information to each other control computer, comprising, in each control computer, the steps of:
assigning a unique serial number to each of said entries made in said files by the control computer;
receiving and storing in said files copies of entries received from the files of each other control computer, each of said copies of an entry received from an other control computer including the unique serial number assigned to the entry by the other control computer;
repetitively sending to each other control computer an acknowledgement massage containing the highest serial number assigned to an entry in a copy of an entry received from said each other control computer;
in response to each acknowledgment message received from an other control computer, sending to the other control computer copies of said entries having serial numbers higher than that received in the acknowledgment message received from the other control computer; and
assigning a date/time stamp is assigned to each of said entries made in said files; and
if a control computer receives duplicate serial numbers from another control computer, the entry bearing the latest date/time stamp prevails.

5. The method recited in claim 4, wherein further:
a new control computer, upon being initiated:
  is informed of the identities of each other control computer; and
  sends to each other control computer an acknowledgement message containing zero as the highest sequential serial number received from each other control computer.

6. The method recited in claim 5, wherein further:
each control computer, in response to said acknowledgement messages from said each other control computer, resends all serial numbers higher than that received in said acknowledgement message,
  each serial number being accompanied by its corresponding entry if extant, or by a predetermined code if a corresponding entry is no longer extant, whereby a control computer can have certainty of receiving all extant entries from each other control computer.

* * * * *